UNITED STATES PATENT OFFICE.

PHILIP B. SADTLER AND SAMUEL P. SADTLER, OF PHILADELPHIA, PENNSYLVANIA.

METHOD OF MAKING ALKALI HYDROXIDS.

No. 877,376.     Specification of Letters Patent.     Patented Jan. 21, 1908.

Application filed September 25, 1907. Serial No. 394,503.

*To all whom it may concern:*

Be it known that we, PHILIP B. SADTLER and SAMUEL P. SADTLER, citizens of the United States, residing in the city of Philadelphia, county of Philadelphia, and State of Pennsylvania, have jointly invented an Improved Method of Making Alkali Hydroxids, of which the following is a specification.

Our invention relates to an improved method whereby an alkali sulfate such as sodium or potassium sulfate may be economically converted into the corresponding alkali hydroxid with the production of valuable side products.

The production of caustic soda, as sodium hydroxid is commonly called, from sodium sulfate, is at present generally effected by a modification of the black-ash process, in which the sodium sulfate (salt cake) is mixed with calcium carbonate and coal and heated. By increasing the amount of coal, larger amounts of calcium oxid are formed, which, when the roasted product comes to be dissolved, has, in the form of calcium hydroxid, a causticizing effect on the sodium carbonate first produced, with the result of a large production of sodium hydroxid or caustic soda.

It has been sought frequently to effect the decomposition of sodium sulfate by heating it with alumina (generally in the form of bauxite). Standard authorities (*Dammer's Handbuch der Chem. Technologie*, I., p. 363) however say with regard to this that alumina (bauxite) decomposes the sulfate only in the pressure of steam at high temperatures. They state in addition that the decomposition may be effected in the presence of carbon, but that, because of the formation of sodium sulfid, the oxid of iron present as an impurity reacts to form a soluble sulfid of iron and sodium, an undesirable contamination. A modification of this last method ignites a mixture of bauxite with alkali or alkaline-earth sulfate and just enough carbon to convert the whole of the sulfate into sulfur dioxid without the formation of sulfid, which would bring about impurity in the aluminate liquor, but this exact point has been found hard to determine in practice. It has also been proposed to fuse bauxite with alkali sulfate and about one fifth its weight of alkali sulfid, without carbon, and this was supposed to furnish a reaction which would liberate all the sulfur as sulfur dioxid. A mixture of bauxite, alkali sulfate and pyrites, figuring the liberation of sulfur as sulfur dioxid and the iron as ferric oxid, has also been suggested. Another method proposed was the heating of alumina, an alkali sulfate and metallic iron, without access of air; the products claimed to be obtained being sodium aluminate, ferrous sulfid, and ferric oxid.

We have found that by the adoption of certain precautions it is possible to completely decompose the alkali sulfate by heating with alumina alone, without the use of steam, of carbon, of sulfids, of iron, or any other ingredient. We have carried out this complete decomposition of the alkali sulfate and have founded upon this method for the production of caustic potash from the corresponding sulfate, which is made up of the following several steps. 1st. Alumina and alkali sulfate are so mixed and heated as to produce directly an alkali aluminate, with evolution of sulfur trioxid, sulfur dioxid and presumably oxygen. 2nd. The aluminate is dissolved and a partial separation of the aluminium hydroxid is effected by agitation of the solution. 3rd. The further and complete decomposition of the alkali aluminate is effected by causticization with lime which leaves the alkali hydroxid alone in solution.

In carrying out our process practically, with for example sodium sulfate, we proceed as follows:—The alumina (or bauxite) is ground very fine and mixed with sodium sulfate, using preferably an excess of alumina over the amount indicated by the molecular proportions. A mixture of seven parts by weight of the hydrated alumina or bauxite and five parts by weight of the anhydrous sodium sulfate was found to give excellent results, although we do not wish to be limited to this ratio, giving it merely as an example. To effect intimate admixture of the ingredients we have found it best after weighing out and mixing the ingredients to add sufficient water to just barely dissolve the sodium sulfate. This pasty mixture of alumina and saturated solution of sodium sulfate is carried down to dryness and entirely dehydrated at a low red heat. The mass is preferably again ground very fine before being used for the roast, as it is necessary for a satisfactory yield that the mixed materials be in very intimate contact. The roasting that follows requires that the temperature be brought to about an incipient yellow heat or higher and not lower than orange, when, if the materials are in intimate contact, the reaction proceeds very rapidly, the product being a sintered mass. This roasting takes place best with free access of air and indeed, with a view to the collection and utilization of the gaseous oxids of sulfur and the hastening of the reaction, it will probably be desirable to have a slight suction applied, although the amount of air drawn through must not be enough to lower the temperature of the furnace. Using the ratio of ingredients mentioned above we obtained a 98% yield. Upon leaching out the aluminate of soda formed and filtering from the excess of alumina used, we obtain a solution in which the alumina and sodium oxid are approximately in the ratio of equal molecules. Utilizing the well known property of such a solution, we decompose the same by continued agitation with separation of the greater part of the alumina in the form of aluminium hydroxid. We then filter from this the sodium aluminate remaining, of the approximate ratio of one alumina to six sodium oxid in combination, and to this add milk of lime for the purpose of precipitating the remaining alumina in the form of insoluble calcium aluminate. The filtrate from this we found to be a solution of caustic soda, containing only a trace of alumina. We have found that the same treatment is applicable to potassium sulfate with its complete conversion into potassium aluminate, and that this, like sodium aluminate, is capable of the same treatment for the recovery of potassium in the form of potassium hydroxid or caustic potash.

Having described our invention, we claim:—

1. In the production of alkali hydroxid, the method which consists in intimately mixing an alkali sulfate with not less than about an equal amount of alumina and heating the mixture to not lower than an orange heat.

2. In the production of alkali hydroxid, the method which consists in intimately mixing finely divided alkali sulfate and alumina in such proportions and heating the mixture, in the absence of reducing agents, to such temperature as to produce directly thereby an alkali aluminate.

3. In the method of making alkali hydroxids, the method described of producing alkali aluminate, which consists in heating to at least an incipient yellow heat a mixture consisting of finely divided alkali sulfate and a larger amount of finely divided alumina.

4. The method of making alkali hydroxid which consists in intimately mixing finely divided alkali sulfate with at least an equal amount of alumina, heating the same to at least an incipient yellow heat until an alkali aluminate is formed therefrom, decomposing the alkali aluminate, and producing alkali hydroxid therefrom.

5. The method of making alkali hydroxid which consists in intimately mixing finely divided alkali sulfate with at least an equal amount of alumina, heating the same to at least an incipient yellow heat until an alkali aluminate is formed therefrom, decomposing the alkali aluminate by agitation to separate a portion of the combined alumina, and precipitating the remainder by the addition of milk of lime.

In testimony whereof we have hereunto set our names this 24th day of September, 1907, in the presence of the subscribing witnesses.

PHILIP B. SADTLER.
SAML. P. SADTLER.

Witnesses:
 JAS. G. DENNY, Jr.,
 ROBERT JAMES EARLEY.